(12) United States Patent
Hanten

(10) Patent No.: US 7,604,531 B2
(45) Date of Patent: Oct. 20, 2009

(54) METHOD OF AND APPARATUS FOR CONTROLLED CLOSURE OF AT LEAST ONE CLIP AROUND A FILLING MATERIAL-FREE PLAIT PORTION OF A TUBULAR CASING AT A FILLING MATERIAL PORTION ENCLOSED BY THE CASING

(75) Inventor: Jürgen Hanten, Bad Nauheim (DE)

(73) Assignee: Poly-Clip System GmbH & Co. KG (DE)

( * ) Notice: Subject to any disclaimer, the term of this patent is extended or adjusted under 35 U.S.C. 154(b) by 0 days.

(21) Appl. No.: 12/108,930

(22) Filed: Apr. 24, 2008

(65) Prior Publication Data
US 2008/0274681 A1 Nov. 6, 2008

(30) Foreign Application Priority Data
May 4, 2007 (DE) .................. 10 2007 021 047

(51) Int. Cl.
*A22C 11/00* (2006.01)
(52) U.S. Cl. ........................................ 452/48
(58) Field of Classification Search ............. 452/30–35, 452/37–39, 21–26, 46–48, 51
See application file for complete search history.

(56) References Cited

U.S. PATENT DOCUMENTS

| | | | | |
|---|---|---|---|---|
| 4,534,084 A | * | 8/1985 | Stanley | 452/33 |
| 4,646,386 A | * | 3/1987 | Dreisin | 452/31 |
| 4,766,645 A | * | 8/1988 | Lamartino et al. | 452/31 |
| 5,158,498 A | * | 10/1992 | Frey | 452/44 |
| 5,230,651 A | * | 7/1993 | Farkonas et al. | 452/29 |
| 5,273,482 A | * | 12/1993 | Beckman et al. | 452/39 |
| 5,378,193 A | * | 1/1995 | Stanley et al. | 452/45 |
| 5,573,454 A | * | 11/1996 | Fox et al. | 452/29 |
| 5,605,502 A | * | 2/1997 | Christensen | 452/30 |
| 5,775,985 A | | 7/1998 | Stanley et al. | |
| 6,117,003 A | * | 9/2000 | Brinson | 452/31 |
| 6,524,178 B1 | * | 2/2003 | Fassler et al. | 452/37 |
| 2007/0249272 A1 | | 10/2007 | Jackel | |

FOREIGN PATENT DOCUMENTS

| | | |
|---|---|---|
| DE | 4412697 C1 | 7/1995 |
| DE | 202005020521 U1 | 3/2006 |
| EP | 0 900 528 A2 | 10/1999 |
| WO | 00/20282 A1 | 4/2000 |

OTHER PUBLICATIONS

EP 08 008 288 Search Report.

* cited by examiner

*Primary Examiner*—Thomas Price
(74) *Attorney, Agent, or Firm*—Hahn Loeser & Parks LLP; Michael H. Minns

(57) ABSTRACT

A method of and an apparatus for controlled closure of at least one clip around a filling material-free plait portion of a tubular casing at a filling material portion enclosed by the casing, where the at least one clip is closed with at least one closure device and where the filling material portion is successively filled with a moved product flow of the filling material and in that operation the casing is withdrawn from a casing supply device, and where moreover the withdrawal movement of the casing is sensed with a sensing device and a control signal is formed therefrom for the joint movement of the at least one closure device with the product flow.

13 Claims, 1 Drawing Sheet

METHOD OF AND APPARATUS FOR CONTROLLED CLOSURE OF AT LEAST ONE CLIP AROUND A FILLING MATERIAL-FREE PLAIT PORTION OF A TUBULAR CASING AT A FILLING MATERIAL PORTION ENCLOSED BY THE CASING

BACKGROUND OF THE INVENTION

The invention concerns a method of and apparatus for controlled closure of at least one clip around a filling material-free plait portion of a tubular casing at a filling material portion enclosed by the casing, wherein the at least one clip is closed with at least one closure device and wherein successive filling material portions are successively filled with a moved product flow of the filling material and in that operation the casing is withdrawn from a casing supply.

To control the operation of fitting the clip it is known to use a filling stop signal for the filling machine or a length abutment that is triggered by the filling material portion being formed, in particular a sausage product.

In comparison, the object of the invention is to provide a method and an apparatus of the kind set forth in the opening part of this specification, in which even in a continuous filling operation exact placement of the clip is achieved without adversely affecting the continuous filling operation.

SUMMARY OF THE INVENTION

The invention provides that the withdrawal movement of the tubular casing from the casing supply is sensed and a control signal is formed therefrom for the joint movement of the at least one closure device with the product flow of the filling material when filling the respective filling material portion.

Preferably in the sensing operation, the withdrawal speed of the tubular casing is determined. In addition, the joint movement of the at least one closure device proportionally to the advance speed of the product flow in the operation of filling the filling material portion is controlled. That provides for a control value that correlates with the filling speed or the advance speed of the filling material portion as it is being formed, in particular sausage product. It is on the basis of that speed that the speed of movement of the closure device is controlled in the joint movement that takes place substantially parallel to the direction of movement of the flow of product. Upon a change in the withdrawal speed of the casing from the casing supply or upon a change in the advance speed of the product flow when filling the casing with the filling material, the control signal with which the joint movement of the closure device is controlled is also correspondingly altered.

Preferably, the joint movement of a displacer device, which forms the filling material-free plait portion, can be controlled in the direction of the advance movement of the product flow when filling the filling material portion, in dependence on the sensed withdrawal movement of the casing from the casing supply. In that case, a control signal which is proportional to the withdrawal movement of the casing or the advance speed of the product flow, can be formed in the same manner as already described hereinbefore. The joint movement of the displacer devices and the closure device can be produced by a common drive or a drive for producing synchronously mutually matched movements of the displacer devices and the closure device. Preferably however, control of the motion of the displacer device and the control device is effected with respectively associated separate drives. The closure device can be a simple clipping device or a double clipping device.

In principle, the withdrawal speed of the tubular casing can be measured over the entire length of the filling material portion that is being formed, in particular the sausage product. As however when displacer shears engage into the casing to form a filling material-free plait portion and/or in the over-spreading movement, the withdrawal speed experiences a change, it is further advantageous if the withdrawal speed is determined only over a short period of time and/or a short lengthwise portion of the tubular casing. As the filling flow remains constant at least approximately over the filling operation, a control or regulating signal for the joint movement of the at least one closure device with the product flow of the filling material when filling the respective filling material portions can be formed by means of that short period of time or that short length portion and a corresponding control or regulating logic, in particular fuzzy logic.

DESCRIPTION OF THE DRAWINGS

The invention is described in greater detail with reference to the FIGURE diagrammatically showing the essential component parts of an embodiment.

DETAILED DESCRIPTION OF THE DRAWINGS

Figure 1:
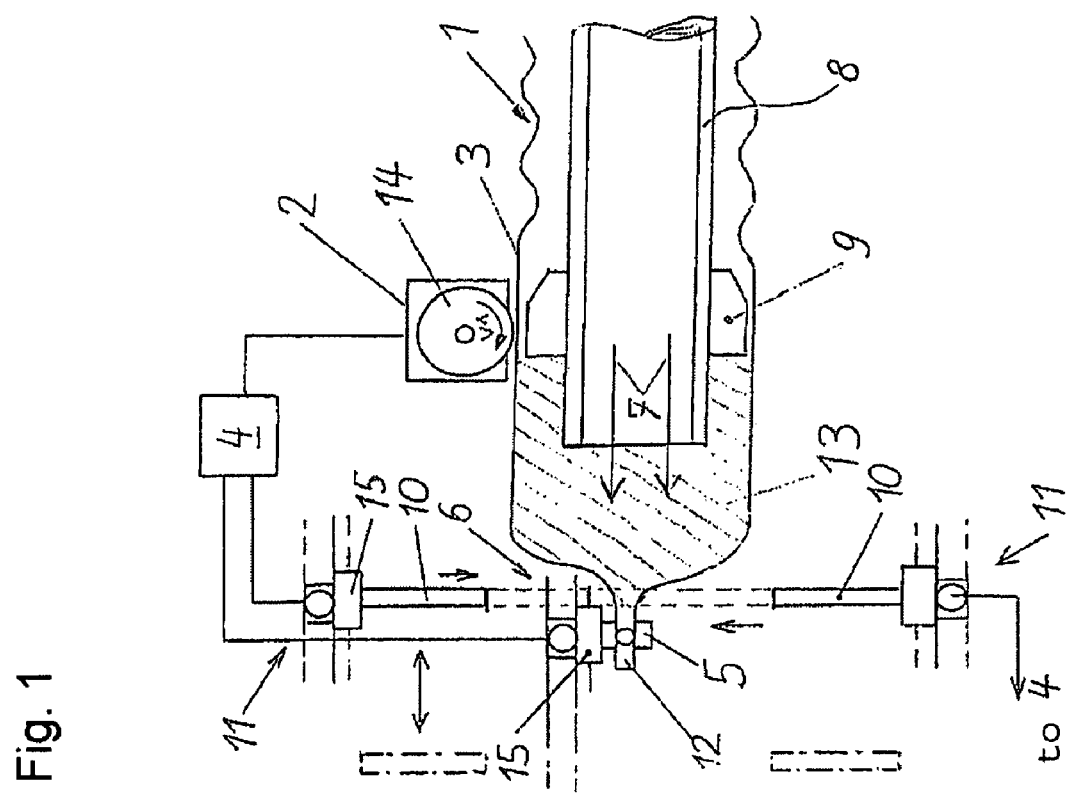

The illustrated embodiment includes a filling pipe 8 by way of which filling material in a product flow 7 is introduced into a filling material portion 13 at a given advance speed. The filling material portion 13 is enclosed by a casing 3 which in the filling operation is withdrawn from a casing supply device 1 in which the casing 3 is to be found for example in the form of a concertinaed caterpillar-like configuration. Displacer devices 10 of which one is shown are provided for forming a filling material portion 13 which is closed off at its respective ends. The displacer devices 10 form a filling material-free plait portion 12 at the beginning and the end of the respective filling material portion 13. The FIGURE shows the plait portion 12 at the front end of the filling material portion 13.

A clip, which extends around the plait portion 12, is closed in the region of the plait portion 12 by means of a closure device 5 which can be in the form of a clip assembly. The closure device 5 can also be in the form of a double clip assembly.

In the illustrated embodiment, the closure device 5 and preferably also the displacer device 10 are jointly moved in substantially parallel relationship with the advance direction of the product flow 7 for a continuously operating filling procedure when filling successive filling material portions 13, in particular sausage products. To control that joint movement, the apparatus has a sensing device 2 that senses the withdrawal movement of the casing 3 from the casing supply device 1. For that purpose, the sensing device can have a sensing wheel 14 which is driven at a given rotary speed in dependence on the withdrawal speed of the casing 3. An electrical sensing signal proportional to that rotary speed is delivered to an evaluation device 4. That evaluation device 4 can be in the form of an electronic computer. For satisfactory measurement of the withdrawal speed of the casing 3, the sensing wheel 14 can be fitted on to a spreading ring 9 that is arranged around the filling pipe 8 and over which the casing 3 is withdrawn. The casing 3 is moved out of a casing supply device 1 between the spreading ring 9 and the sensing wheel 14 in the filling operation.

The evaluation device 4 forms a control signal with which a drive device 6 for the closure device 5 is controlled from the sensing signal, in particular the rotary speed-proportional sensing signal. The drive device 6 causes a movement of the closure device 5 in substantially parallel relationship with the advance direction of the product flow 7 when filling the filling material portion 13 with the filling material. For that purpose the drive device 6 can have for example a pinion, which is driven by an electric motor and which drives a carriage 15 by way of a transmission. The closure device 5 is mounted on the carriage 15. The carriage 15 can be guided in a longitudinal guide parallel to the advance direction of the product flow 7. The transmission can be in the form of a toothed belt transmission or a rack transmission that engages the carriage 15 and meshes with the drive pinion. Control of the electric motor of the drive device 6 is effected with the control signal supplied by the evaluation device 4. That control signal causes the closure device 5 to be jointly moved synchronously with the advance movement of the filling portion 13 in the filling operation. During that synchronous joint movement the closure operation is effected, being performed by the closure device 5 on the clip that extends around the plait portion in the closure operation for sealing off the end of the filling material portion 13.

The displacer device 10 can also have an associated drive device 11, which is of substantially the same structure as the drive device 6 for the closure device 5. With that drive device 11, the displacer device 10 is also jointly moved synchronously with the advance movement of the filling material portion 13 in the filling operation.

As soon as the closure operation with which the clip is closed around the plait portion 12 by means of the closure device is concluded, the closure device 5 and, optionally the displacer device 10, is moved back into the respective starting position thereof in order to form the plait portion 12 at the other end of the filling material portion 13 and also to close the other end of the filling material portion 13 by fitting and closing a clip by means of the closure device 5. As described hereinbefore, that operation is also effected in such a way that the closure device 5 and optionally the displacer device 10 is moved jointly synchronously with the advance movement of the product flow 7 continuously supplied through the filling pipe 8. The second displacer device (not shown in greater detail) is also moved in the described fashion.

As already explained hereinbefore that controlled joint movement is effected in dependence on the sensed withdrawal movement of the casing 3 over the spreading ring 9 and thus synchronously with the advance movement of the product flow 7 when filling the respective filling material portion 13 with the filling material.

The invention claimed is:

1. A method of controlled closure of at least one clip around a filling material-free plait portion of a tubular casing at a filling material portion enclosed by the casing, wherein the at least one clip is closed with at least one closure device and wherein successive filling material portions are filled with a moved product flow with the filling material and in that operation the casing is withdrawn from a casing supply, the method comprising the steps of:
sensing the withdrawal movement of the casing between two successive closure operations over at least one of a short period of time and a short length portion; and
forming a control signal based on the sensed withdrawal movement therefrom; and
controlling the joint movement of the at least one closure device with the product flow of the filling material when filling the respective filling material portion based on the control signal by moving the closure device at least in a direction approximately parallel to the direction of movement of the product flow; and
closing the clip around the filling material-free plait portion during said joint movement.

2. The method of claim 1 further comprising: determining the withdrawal speed of the tubular casing during the sensing step.

3. The method of claim 1 where the step of forming the control signal for the joint movement of the at least one closure device comprises forming the control signal proportionally to the advance movement of the product flow of the filling material when filling the respective filling material portion.

4. The method of claim 1 where the step of controlling the joint movement comprises controlling the speed of the joint movement of the closure device relative to the advance speed of the product flow of the filling material when filling the respective portion.

5. The method of claim 1 further comprising filling the respective successive filling material portions with a continuously moved product flow of the filling material.

6. The method of claim 1 further comprising controlling the joint movement of a displacer device disposed at the end of the plait portion and with which the respective filling material-free plait portion is formed with the at least one closure device and the product flow of the filling material based on the sensed withdrawal movement of the tubular casing.

7. The method of claim 6 where the step of controlling the joint movement of the displacer device uses the same control signal as the closure device.

8. The method of claim 7 where the at least one closure device and the displacer device are jointly moved with the product flow upon filling of the respective filling material portion by means of respectively associated separate drives.

9. An apparatus for controlled closure of at least one clip around a filling material-free plait portion of a tubular casing at the end of a filling material portion enclosed by the casing comprising a closure device which closes the at least one clip in embracing relationship with the plait portion and a casing supply device from which the casing is withdrawn when filling successive filling material portions with a moved product flow of the filling material, the apparatus comprising:
a sensing device capable of sensing the withdrawal movement of the casing out of the casing supply device between two successive closure operations over at least one of a short period of time and a short length portion and capable of forming a corresponding sensing signal;
a controller capable of forming a control signal from the sensing signal operatively connected to the sensing device;
the closure device being connected to a drive device for jointly moving the closure device in substantially parallel relationship with the advance movement of the product flow controlled by the control signal.

10. The apparatus of claim 9 where the control signal is proportional to at least one of the withdrawal speed of the casing and the advance speed of the product flow.

11. The apparatus of claim 9 where closure of the at least one clip around the plait portion is effected during the synchronous joint movement of the closure device with the product flow upon filling of the filling material portion.

12. The apparatus of claim 9 further comprising:
a drive device for at least one displacer device, with which the displacer device is jointly moved in substantially parallel relationship to the advance direction of the product flow in dependence on the sensing signal from the sensing device.

13. The apparatus of claim 9 where the closure device and the displacer device are moved back into their starting positions after the termination of the clip closure operation by their associated drive devices.

* * * * *